Sept. 25, 1951
E. F. NORELIUS
2,568,897
SHAFT SEAL
Filed Oct. 23, 1947
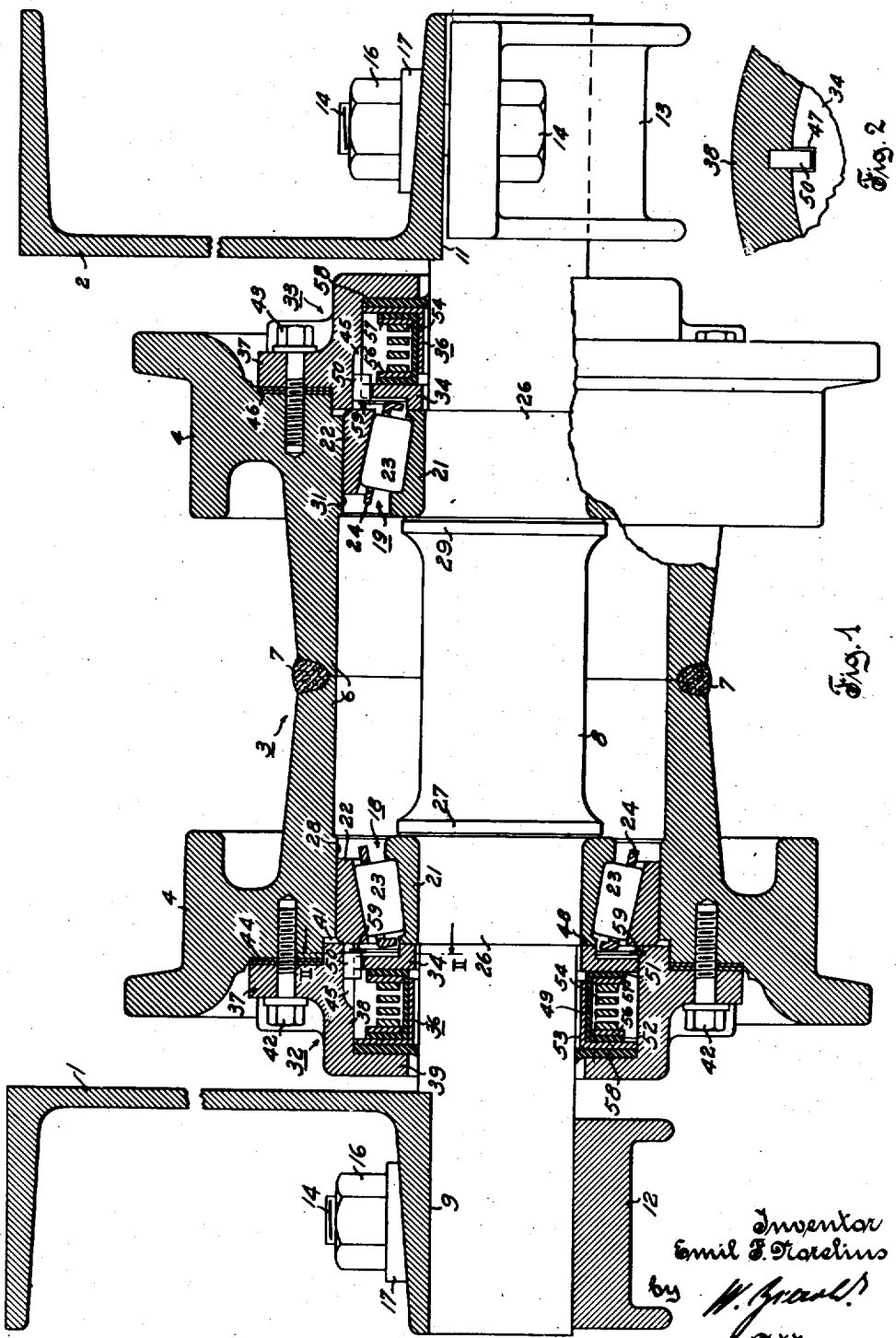
Inventor
Emil F. Norelius
by
Attorney

UNITED STATES PATENT OFFICE 2,568,897

SHAFT SEAL

Emil F. Norelius, Springfield, Ill., assignor to Allis-Chalmers Manufacturing Company, Milwaukee, Wis., a corporation of Delaware Application October 23, 1947, Serial No. 781,541

4 Claims. (Cl. 286—11)

1

The invention relates to sealed bearing structures, and it is concerned more particularly with a bearing and seal assembly in which the bearing is sealed against the ingress of dust and against the egress of lubricant by means of an axial contact seal, that is, by a type of seal in which an axially movable sealing ring which has a sealing surface at one side, is resiliently urged into cooperative engagement with a complementary sealing surface by means of a resilient backing unit at the other side of the sealing ring.

Sealed bearing structures of the mentioned type are well known in the art, and efforts have been made during the past to adapt such structures for use under extremely severe operating conditions, as for instance in the track rollers for crawler tractors, where the bearings are subject to relatively heavy loads, both radially and axially, and where large amounts of dust and dirt are normally present and apt to injure the seals.

U. S. Patent 2,358,830, granted on September 26, 1944, to F. A. Schick for Track Roller Seal, discloses a heavy duty bearing and seal assembly of the mentioned character, and in which a bracket which is press-fitted upon the supporting shaft of the track roller serves as a mounting element for the shaft on a truck frame, and also as an abutment for the resilient backing unit of the seal.

Experience has shown that an axial contact seal such as disclosed in the mentioned Schick patent requires a certain sealing pressure which is neither too high nor too low, and which has been found to lie in a close range between predetermined limits. In a construction such as disclosed in the Schick patent, where the sealing pressure in the assembled unit is dependent on an accurate axial positioning of a bracket which is press-fitted upon the shaft, it is necessary to exercise considerable care in assembling the unit, and also to manufacture the various parts which cooperate to form the seal, with a high degree of precision, so that the sealing pressure in the assembled unit will meet the above mentioned requirement.

For purposes of inspection and repair it is desirable that the bearing and seal assembly can be readily dismantled, and in this connection a construction such as disclosed in the mentioned Schick patent presents a further difficulty because with a construction of that type the dismantling of the bearing and seal assembly requires removal of the press-fitted bracket from the shaft, and when the unit is to be reassembled it is again necessary to install the press-fitted bracket in a highly accurate axial position on the shaft.

The present invention contemplates a bearing and seal assembly of the general character disclosed in the mentioned Schick patent, but which avoids the shortcomings and disadvantages which have been pointed out hereinbefore.

Generally, it is an object of the invention to improve the bearing and seal assembly which is disclosed in the mentioned Schick patent.

A further object of the invention is to provide a bearing and seal assembly of the mentioned character in which the required amount of sealing pressure will be readily and automatically insured upon assembly of the bearing and seal in operative condition.

A further object of the invention is to provide an improved seal assembly in which the sealing ring and the parts which form the resilient backing unit for the sealing ring are mounted on a common support so as to form a preassembled, self-contained unit which may be readily installed in or removed from the structure or apparatus in which it is to be used.

A further object of the invention is to provide an improved seal assembly of the above mentioned character which affords a double seal between relatively rotatable parts, one seal being afforded by engagement of the axially movable sealing ring on one of the relatively rotatable parts with a complementary sealing surface on the other of said parts, and another seal being afforded by a packing ring between the relatively rotatable parts and which is so arranged as to protect the resilient backing unit for the sealing ring from dust and other foreign matter.

A further object of the invention is to provide an improved seal assembly which is more compact axially, which involves fewer component parts, and which may be manufactured more economically than the bearing and seal assembly disclosed in the mentioned Schick patent.

A still further object of the invention is to provide an improved seal unit of the axial contact type, and more particularly to provide an improved mounting of the sealing ring on the supporting structure of such a unit.

These and other objects and advantages are attained by the present invention, various novel features of which will be apparent from the description herein and the accompanying drawing disclosing an embodiment of the invention, and will be more particularly pointed out in the accompanying claims.

Fig. 1 of the drawing shows a sectional view of a track roller installation for a crawler tractor.

Fig. 2 shows an enlarged detail view in section on line II—II of Fig. 1.

The installation shown in Fig. 1 forms part of a self-laying track unit which comprises a relatively long frame extending in the direction of travel, and a series of track engaging rollers mounted on the frame. The frame usually comprises a pair of transversely spaced side members in the form of channels which are shown in the drawing and designated by the reference characters 1 and 2, respectively. The rollers, only one of which is shown in the drawing and generally designated by the reference character 3, are located between the channels, and serve to sustain the track frame on the lower run of an endless track belt, not shown.

In conformity with conventional practice, the roller 3 is made up of two identical halves each of which comprises a flanged rim part 4 and a hub sleeve 6. The two halves of the roller are rigidly connected together by a welded seam 7 at relatively adjacent ends of the hub sleeves 6, to form a unitary wheel structure with a relatively large hub opening which extends from the axially outer side of one rim part 4 to the axially outer side of the other rim part 4.

A supporting shaft or axle, generally designated by the reference character 8, extends through the hub opening of the roller 3 and is connected at its opposite ends with the lower flanges of the channels 1 and 2. Flats 9 and 11 are milled on the axle shaft 8 at its opposite ends to form seats for engagement with the flat lower sides of the side channels 1 and 2. A cap member 12 embraces the portion of the axle shaft 8 underlying the channel 1, and a similar cap member 13 embraces the portion of the axle shaft 8 underlying the channel 2. As shown at the right side of the drawing, a bolt 14 extends through an ear portion of the cap member 13, at one side of axle shaft 8, and through the lower flange of the channel 2, and a similar bolt, not shown, extends through another ear portion of the cap member 13, and through the lower flange of the channel 2 at the other side of the shaft. The bolt 14 at one side of the axle shaft 8, and the corresponding bolt at the other side of the axle shaft 8, each carry a nut 16 which may be drawn up against a wedge washer 17 in order to tighten the cap 13 on the axle shaft 8 and draw the flat 11 of the shaft into tight engagement with the channel 2. The same explanations apply to the connection between the axle shaft 8 and the channel 1 by means of the cap member 12, which is shown on the left side of the drawing.

The roller 3 is rotatably connected with the axle shaft 8 by means of a pair of conical roller bearings 18 and 19 adjacent, respectively, to the axially opposite ends of the roller. The roller bearing 18 comprises an inner race 21, an outer race 22, a circumferential series of antifriction rollers 23, and a cage 24 for the antifriction rollers. The inner race 21 is fitted upon a cylindrical surface portion 26 of the axle shaft 8, and a thrust shoulder 27 is formed on the axle shaft 8 at the axially inner side of the inner race 21 for axial abutment by the latter. The outer race 22 of the roller bearing 18 is mounted within the hub opening of the roller 3 on an inner cylindrical surface 28 to support the outer race 22 within the roller and permit axial adjustment of the outer race 22 relative thereto.

The foregoing explanations with reference to the roller bearing 18 similarly apply to the roller bearing 19 at the other end of the roller 3, that is, the inner race 21 of the roller bearing 19 is seated at its axially inner side against another thrust shoulder 29 which is formed integrally with the axle shaft 8, and the outer race 22 of the roller bearing 19 is supported on an inner cylindrical surface 31 of the roller 3 for axial adjustment relative thereto.

The antifriction rollers 23 of the roller bearing 18 cooperate with the inner and outer races 21 and 22, respectively, of the bearing to transmit radial and axially inward thrust from the axially movable outer race to the inner race, and the antifriction rollers 23 of the roller bearing 19 similarly cooperate with the inner and outer races 21 and 22 of said bearing to transmit radial and axial inward thrust from the outer race to the inner race.

A cap member, generally designated by the reference character 32, is secured to the roller 3 at the axially outer side of the roller bearing 18 in cooperative engagement with the outer race 22 of the bearing, and a similar cap member 33 is secured to the roller 3 at the axially outer side of the roller bearing 19 in cooperative engagement with the outer race 22 of the latter bearing.

The cap member 32 serves two purposes, namely, first as a retainer for the outer race 22 of the roller bearing 18, and second, as an annular supporting structure for a sealing ring 34 and a resilient backing unit 36 for said sealing ring. Generally, the cap member 32 comprises a disc or flange part 37, a circumferential axially extending wall part 38, and a radial inwardly extending wall part 39. The circumferential wall part 38 is extended axially a short distance beyond the axially inner side of the flange part 37 to form an annular lip which is received in an annular recess 41 of the roller 3. The end face of said annular lip extends radially inwardly at the axially outer side of the outer race 22 of the roller bearing 18 and forms an axial abutment for said outer race. A circumferential series of cap screws 42 extend through the flange part 37 of the cap member 32 into tapped holes of the roller 3 in order to secure the cap member 32 in axially fixed position on the roller 3.

The cap member 33 is a duplicate of the cap member 32 and is secured on the roller 3 at the axially outer side of the roller bearing 19 by means of a circumferential series of cap screws 43.

The cap members 32 and 33, when installed on the roller 3, prevent axial outward movement of the outer races 22 of the roller bearings 18 and 19, respectively, relative to the roller 3. A stack of shims 44 is interposed between the flange part 37 of the cap member 32 and the axially outer side of the roller 3 at the left end of the latter, and another stack of shims 46 is interposed between the disc part 37 of the cap member 33 and the axially outer side of the roller 3 at the other end of the latter.

It is desirable to eliminate all radial and axial play of the roller 3 relative to the axle shaft 8, and it will be apparent that this result may readily be accomplished by proper selection of the number of shims 44 and 46. For instance, if it should be found that the roller 3 has an undesirable amount of play relative to the shaft after the cap members 32 and 33 have been tightened up by means of the cap screws 42 and 43, one of the cap members may be removed and one or more of the shims taken out, and upon reinstallation of the cap member, the lip in contact with the outer race of the corresponding roller bearing will then press said outer race inwardly, with the result that the roller 3 will have less axial play relative to the axle shaft 8. In this manner, the roller bearings 18 and 19 may be tightened or loosened to afford more or less torque resistance, and the preferred practice, in assembling the unit, is to adjust the roller bearings by means of the shims so that in the completed installation the roller bearings will permit rotation of the roller 3 relative to the axle shaft 8 only under appreciable torque. When the unit is then operated for a certain breaking-in period, the roller will become more freely rotatable without developing any objectionable radial and axial play.

Referring now to the sealing of the roller bearings, the circumferential wall portion 38 of the cap member has an accurately finished inner cylindrical surface, and the sealing ring 34 has an accurately finished cylindrical outer surface, whose diameter is a few thousandths of an inch less than the inner cylindrical surface of the wall portion 38. The difference between the diameters of the mentioned two cylindrical surfaces is such that the sealing ring may be telescopically moved into the cap member with a light sliding fit, and in the position in which the sealing ring is shown in Fig. 1 it will therefore be accurately centered on the cap member 32 in axially shiftable relation thereto.

The cap member 32 has a circumferential series of axially extending grooves or keyways 45 at the radially inner side of its circumferential wall portion 38, and the sealing ring 34 has a corresponding circumferential series of axially extending grooves or keyways 47, Fig. 2. In the assembled unit, the keyways 45 on the cap member 32 register, respectively, with the keyways 47 on the sealing ring 34, and each pair of registering keyways 45 and 47 accommodates an oblong longitudinally disposed key or thrust transmitting element 50, the keys as shown being of somewhat greater axial length then the keyway 47 on the sealing ring 34. The height or radial thickness of the keys 50, and the depth of the keyways 45 and 47, are properly dimensioned so that the top surfaces of the keys may bear upon the bottom surfaces of the keyways 45, while the bottom surfaces of the keys are slightly spaced from the bottom surfaces of the grooves 47, as shown in Fig. 2. The width or circumferential thickness of the keys 50 and the circumferential width of the keyways 45 and 47 are properly dimensioned so that the keys will have a tight fit in the keyways 45, but will have slight lateral clearance in the keyways 47, with the result that the sealing ring 34 will be locked against rotation relative to the cap member 32 but will be free to move axially thereof.

At its inner periphery, the sealing ring 34 is radially spaced from the axle shaft 8, and a radial sealing surface 48 is formed on the sealing ring 34 at the front side of the latter, opposite to the inner race 21 of the roller bearing 18 for cooperative engagement with the axially outer side of said inner race. It is important that the sealing ring 34 be accurately centered on the cap member 32 and that the latter be accurately centered on the roller 3 to avoid any eccentricity between the annular sealing surfaces on the sealing ring 34 and the inner race 21. The described connection between the sealing ring 34 and the cap member 32 permits accurate centering and circumferential locking of the sealing ring on the cap member in an economical manner.

The resilient backing unit 36 for the sealing ring 34 is operatively interposed between the latter and the radial inwardly extending wall part 39 of the cap member 32. An annular seal boot of rubber like material which forms part of the backing unit 36 comprises a sleeve part 49, a first flange part 51 formed integrally with the sleeve part 49 at the right end thereof and extending radially outwardly therefrom in axially abutting relation with the rear face of the sealing ring 34, and a second flange part 52, formed integrally with the sleeve part 49 at the left end thereof and extending radially outwardly therefrom. Associated with the supporting structure for the sealing ring 34, that is, with the cap member 32, is an annular metal stamping 53 which has a tubular part extending into the sleeve part 49 of the seal boot from the left end, and an end flange which is seated at its outer periphery on the cylindrical inner surface of the circumferential wall part 38 of the cap member 32. The end flange of the stamping 53 forms a third flange part in radially overlapping and axially abutting relation with the axially outer face of the second flange part 52 of the seal boot. Spring means, in the form of a flat wire coil spring 54, are operatively interposed between the first and second flange parts 51 and 52 of the seal boot for urging the first flange part 51 axially against the rear face of the sealing ring 34, and for urging the second flange part 52 axially against the third flange part formed on the stamping 53. Thrust washers 56 and 57 are interposed between the flange parts 51 and 52 and the opposite ends, respectively, of the coil spring 54.

An annular wiper member or packing ring 58 of suitably flexible material, such as synthetic rubber, felt or leather, is mounted within the cap member 32 at the axially outer end of the latter, and in rear of, that is, at the axially inner side of the sealing ring 34. As shown, the annular wiper 58 is axially interposed between the inner face of the radial wall part 39 of the cap member 32 and the flange part of the stamping 53, and it has a marginal portion at its inner periphery resiliently contacting a cylindrical surface portion of the axle shaft 8.

In the assembled condition of the parts as shown in the drawing, the coil spring 54 is in a state of axial compression, which causes the sealing ring to bear upon the axially outer face of the inner race 21 of the roller bearing 18. The reaction of the tensioned coil spring 54 is taken up on the radial wall part 39 of the cap member 32, the axial thrust of the spring being transmitted to said wall part through the thrust washer 56, flange part 52, stamping 53, and wiper member 58. The sealing ring is preferably made of steel, and its sealing surface in contact with the inner race 21 of the roller bearing 18 is accurately finished, hardened and lapped. The complementary sealing surface at the axially outer side of the steel race 21 is also accurately finished, hardened and lapped to insure that no dust particles can enter between the cooperating sealing surfaces, and no lubricant from the interior of the roller can leak past these surfaces. The desired amount of axial pressure acting upon the sealing ring 34 in order to force it into cooperative engagement with the complementary sealing surface on the inner race is automatically insured when the roller bearings 18 and 19 are adjusted by means of the shims 44 and 46, as explained hereinbefore, so as to eliminate all radial and axial play of the roller 3 relative to the axle shaft 8.

The seal arrangement at the right end of the roller 3 is an exact duplicate of the seal arrangement at the left end, which has been explained hereinbefore, the various parts of the seal at the right end being designated by the same reference characters as those at the left end, and the foregoing explanations with respect to the seal associated with the cap member 32 at the left end similarly apply to the seal associated with the cap member 33 at the right end of the roller 3.

The track roller installation shown in the drawing may readily be disassembled for purposes of inspection and repair. After the axle shaft 8 has been detached from the frame channels 1 and 2, the cap screws 42 may be taken out in order to detach the cap member 32, and the cap screws 43 may be taken out in order to detach the cap member 33. In order to prevent the sealing ring 34 from being pushed out of the cap member 32 when the latter is removed from the roller 3, a snap ring 59 is mounted in an annular groove on the cap member 32 at the axially inner side of the sealing ring 34, and in axially abutting relation with the axially inner ends of the keys 50. The snap ring 59 forms an internal projection on the cap member, which is axially engageable by the sealing ring 34 under the action of the resilient backing unit for the sealing ring, when the cap member is detached from the roller, but which is not engaged by the sealing ring in the operative condition of the unit as shown in the drawing.

The same provisions for limiting axial movement of the sealing ring relative to the cap member are made in the seal which is associated with the cap member 33.

It will be noted that in each seal assembly the sealing ring 34 and the parts which form the resilient backing unit therefor are mounted on a common support, namely the cap member, so as to form a preassembled, self-contained unit, which may be handled independently of the roller bearings 18 and 19, respectively.

It will further be noted that the arrangement of the parts as shown permits a relatively wide axial spacing of the roller bearings 18 and 19 from each other due to the relatively short axial spaces required for the seals. If desired, the wiper members 58 may be omitted.

It should be understood that it is not intended to limit the invention to the particular forms and details described hereinabove and that the invention includes such other forms and modifications as are embraced by the scope of the appended claims.

It is claimed and desired to secure by Letters Patent:

1. In an axial contact seal, the combination of, an annular supporting structure, a sealing ring mounted within said supporting structure in axially movable relation thereto and having a front face sealingly cooperable with a complementary sealing surface, a sleeve part of rubber like material extending axially of said supporting structure in radially inwardly spaced relation to the inner periphery of the latter, a first flange part of rubber like material formed integrally with said sleeve part at one end thereof and extending radially outwardly therefrom in axially abutting relation with the rear face of said sealing ring, a second flange part of rubber like material formed integrally with said sleeve part at the other end thereof and extending radially outwardly therefrom, a tubular member extending axially into said sleeve part from said other end thereof and having a third flange part at its axially outer end in radially overlapping and axially abutting relation with the axially outer face of said second flange part, abutment means associated with said supporting structure for axial engagement by the axially outer face of said third flange part, and spring means operatively interposed between said first and second flange parts for urging said first flange part axially against said rear face of said sealing ring, and for urging said second flange part axially against said third flange part.

2. In an axial contact seal, the combination of, an annular supporting structure having a circumferential axially extending wall part and a radial inwardly extending wall part, a sealing ring mounted within said supporting structure in axially movable relation thereto opposite to said radial wall part and having a front face sealingly cooperable with a complementary sealing surface, a sleeve part of rubber like material extending axially of said supporting structure in radially inwardly spaced relation to said circumferential wall part, a first flange part of rubber like material formed integrally with said sleeve part at one end thereof and extending radially outwardly therefrom in axially abutting relation with the rear face of said sealing ring, a second flange part of rubber like material formed integrally with said sleeve part at the other end thereof and extending radially outwardly therefrom, a tubular member extending axially into said sleeve part from said other end thereof and having a third flange part extending radially outwardly therefrom between the axially inner face of said radial wall part and the axially outer face of said second flange part, a packing ring operatively interposed between the axially inner face of said radial wall part of said supporting structure and the axially outer face of said third flange part, and spring means operatively interposed between said first and second flange parts for urging said first flange part axially against said rear face of said sealing ring, and for urging said second flange part axially against the axially inner face of said third flange part.

3. An axial contact seal as set forth in claim 13, in which said packing ring has a circular inner edge of smaller diameter than the inside diameter of said tubular member.

4. In an axial contact seal, the combination of, an annular supporting structure, a sealing ring mounted within said supporting structure in axially movable relation thereto and having a front face sealingly cooperable with a complementary sealing surface, a sleeve part of rubber like material extending axially of said supporting structure in radially inwardly spaced relation to the inner periphery of the latter, a first flange part of rubber like material formed integrally with said sleeve part at one end thereof and extending radially outwardly therefrom in axially abutting relation with the rear face of said sealing ring, a second flange part of rubber like material formed integrally with said sleeve part at the other end thereof and extending radially outwardly therefrom, a tubular member extending axially into said sleeve part from said other end thereof and having a third flange part in radially overlapping and axially abutting relation with the axially outer face of said second flange part, means connected with said supporting structure and cooperable with said tubular member for positioning said tubular member radially on and preventing axial outward displacement of said tubular member relative to said supporting structure, and spring means operatively interposed between said first and second flange parts for urging said first flange part axially against said rear face of said sealing ring, and for urging said second flange part axially against said third flange part.

EMIL F. NORELIUS.

REFERENCES CITED

The following references are of record in the file of this patent:

UNITED STATES PATENTS

| Number | Name | Date |
|---|---|---|
| 1,930,312 | Greenhoe | Oct. 10, 1933 |
| 2,203,525 | Dupree | June 4, 1940 |
| 2,222,779 | McHugh | Nov. 26, 1940 |
| 2,283,871 | Norelius | May 19, 1942 |
| 2,402,995 | Garraway | July 2, 1946 |
| 2,403,298 | Payne | July 2, 1946 |
| 2,408,215 | Jacobsen | Sept. 24, 1946 |

FOREIGN PATENTS

| Number | Country | Date |
|---|---|---|
| 700,323 | Germany | 1940 |

Certificate of Correction

Patent No. 2,568,897 — September 25, 1951

EMIL F. NORELIUS

It is hereby certified that error appears in the printed specification of the above numbered patent requiring correction as follows:

Column 8, line 53, for the claim reference numeral "13" read *2*;

and that the said Letters Patent should be read as corrected above, so that the same may conform to the record of the case in the Patent Office.

Signed and sealed this 15th day of January, A. D. 1952.

[SEAL]

THOMAS F. MURPHY,
*Assistant Commissioner of Patents.*